PRODUCTION OF MULTILINEAR SCREENS

Filed March 7, 1950 3 Sheets--Sheet 1

INVENTOR
ALFRED N. GOLDSMITH
BY
Roderick Malcolm
ATTORNEY

INVENTOR
ALFRED N. GOLDSMITH
BY
Roderick Malcolm
ATTORNEY

PRODUCTION OF MULTILINEAR SCREENS
Filed March 7, 1950 3 Sheets--Sheet 3
Fig. 8.
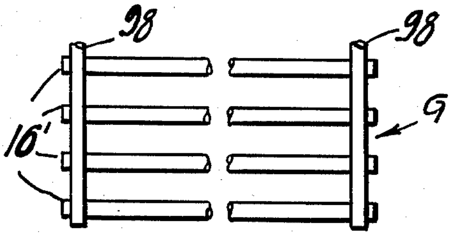
Fig. 9.
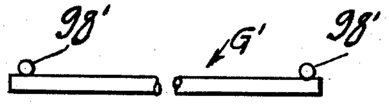
Fig. 10.
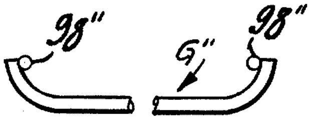
Fig. 11
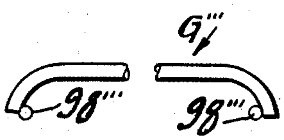
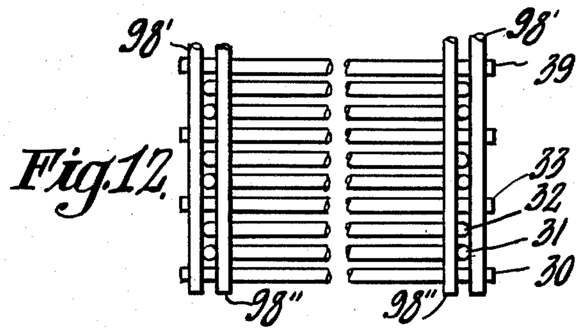
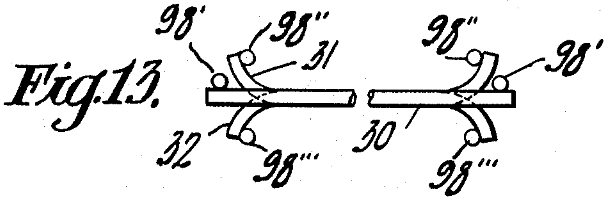
Fig. 12. Fig. 13.
INVENTOR
ALFRED N. GOLDSMITH
BY Roderick Malcolm
ATTORNEY Patented Feb. 23, 1954

2,669,768

UNITED STATES PATENT OFFICE 2,669,768

PRODUCTION OF MULTILINEAR SCREENS

Alfred N. Goldsmith, New York, N. Y., assignor to Radio Corporation of America, a corporation of Delaware Application March 7, 1950, Serial No. 148,245

2 Claims. (Cl. 29—148)

This invention relates to the production of multilinear screens in which there are extremely narrow and closely-adjacent lines of diverse fluorescent materials.

While the invention has various applications, it is herein disclosed as applied to a particular type of color television. In this type of television, there are utilized fluorescent screens which include linear stripes or lines of material fluorescent in the component colors of an additive color television process. Such lines may (1) be fluorescent in red, green and blue, (2) have a length equal to the width or height of the target of the picture reproducing tube, and (3) have a width which is a fraction of the dimensions of the elemental scanning spot corresponding to detail in the final color picture. Thus, in a tricolor process, the width of each of the fluorescent lines would be less than one-third the size of the final picture element and the scanning spot would have a width not exceeding that of the line (preferably somewhat smaller), so that color degradation through scanning spot overlap is minimized or avoided.

One method by which such multi-linear fluorescent screens for color television have been made heretofore involves the coating of the edges of glass plates with a fluorescent material of one of the component colors. Such plates are then mechanically interleaved with plates which have their edges coated with materials fluorescent in the other two component colors (for a tricolor process). The resulting assembly is used to print a multi-linear pattern on an appropriate screen base. (As to this, see Leverenz 2,310,863 patented February 9, 1943.)

The present invention provides improved methods by which the multi-linear screen is produced at higher speed and at lower cost than heretofore realized. Thus, according to one method, a multiplicity of flexible or semi-flexible strips (1) are edge-coated with fluorescent materials by spraying or dipping, (2) are assembled in the required interleaved relationship, (3) are passed through a trough or equivalent guide, and (4) are utilized to print lines of the fluorescent materials on a screen surface. The screen surface may be coated with an adhesive material before printing. After this process of transferring the lines of fluorescent material from the edges of the strips to the screen surface is completed, the strips may pass to a plurality of take-up reels and the printing or transfer process may be repeated thereafter without recoating the edges of the strips.

Alternatively, the multi-linear screen itself may consist of filaments or wires coated and arranged as indicated in connection with the edge-coated strips. In this case, groups of wires carrying like fluorescent material may be spot-welded or otherwise fastened to conducting terminals or supports. The wires may be transparent insulators, insulators covered with conductive coating, or conductors.

Instead of using the coated wires to form the screen itself, they may be assembled in a trough or other guide and utilized to print a screen base as indicated in connection with the edge-coated strips.

The invention will be better understood from the following description considered in connection with the accompanying drawings and its scope as indicated by the appended claims.

Referring to the drawings:

Figs. 8 through 13 are detail views showing the structure of the grids formed by the process of Fig. 7.

Figure 1:
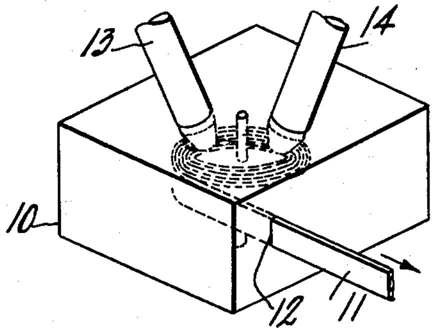
Fig. 1 illustrates a process wherein fluorescent material is applied to one edge of a coiled strip in the form of a spray.

In all of the following, it should be noted that a large number of parallel lines of material fluorescent in one of the component colors must be provided upon the screen surface. The exact number of lines thus required will depend upon whether such lines are horizontal (that is, parallel to the scanning direction according to present practice) or vertical. Broadly, the number of complete picture elements in any specific type of picture (e. g., a 525-line picture) is well known for both the horizontal and vertical dimensions. This number is, of course, a function in these cases of the nominal number of horizontal lines in the picture, the return-trace period expressed as a fraction of the total scanning time, and (in the case of vertical fluorescent material lines) also a function of the aspect ratio and the available frequency band as compared with that theoretically required for equal vertical and horizontal resolution in a picture of the stated number of horizontal lines. Since such figures are well known, and since their computation and use form no part of this invention, they will not be further considered. It should, however, be noted that the number of fluorescent-material-carrying strips or wires required will be equal to the actual number of picture elements perpendicular to the strip or wire dimension multiplied by the number of component colors. If, for example, there were illustratively 400 picture elements in each scanning line in a tricolor process, and if the wires or strips were vertical, there would necessarily be 400 such strips or wires for each component color, or a total of 1200. Keeping these numbers in mind, the construction shown in the drawings will be clear in their purpose and operation.

The nature of one form of the present invention includes the use of narrow surfaces (edges of strips, or wires) as carriers or transfer elements for particular kinds of fluorescent materials from a point where such materials are applied to the narrow surfaces in question to the point where they are transferred, in suitable juxtaposed relationship, onto the final multilinear screen. Accordingly, means must be provided for applying the transferred materials to the said narrow surfaces.

Fig. 1 shows a container 10 within which is rotatably supported a roll of a transfer element in the form of a flat strip 11 arranged to be drawn out of the container through an orifice 12. The strips 11 are preferably, but not necessarily, made of metal. They may be made of a cloth or fibrous material of any desired porosity, or they may even be made of a plastic with a smooth or matte surface. From spray guns 13 and 14 a fluorescent material of a given component color is applied to the upper edge of the narrow strip 11. One satisfactory phosphor-suspension medium, for use in spray guns, is acetone plus a trace of acetic acid. As will be explained in connection with Figs. 4 and 7, the strip may pass from the container 10 over suitably disposed guide rollers to a printing or transfer device wherein the strips are brought into such relationship as to print a multilinear screen on a screen base.

Figures 2, 4:
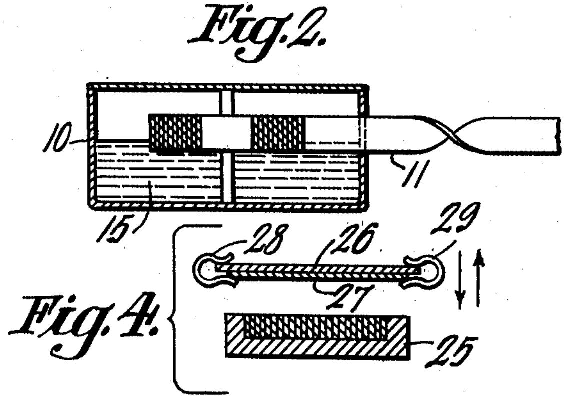
Fig. 2 illustrates a process wherein the edge of the strip is moved in contact with the surface of a body of the fluorescent material.
Fig. 4 illustrates the step of printing a screen base from the edge-coated strips.

Fig. 2 shows an alternative method of applying the fluorescent material to the edge of the strip 11. In this case, the strip is supported so that its lower surface rests upon the emulsion or suspension of fluorescent material 15 in the container 10. The level of the material 15 may be kept at a suitable level in any convenient manner. Here the suspension medium for the phosphor preferably comprises from say, 3 per cent to about 20 per cent of nitrocellulose plus amyl (or butyl) acetate. Either before or after passing out of the container 10, the strip 11 is preferably turned through 180 degrees so that its coated edge is uppermost as it is moved to a take-up reel or to a strip assembly and printing device.

Figure 3:
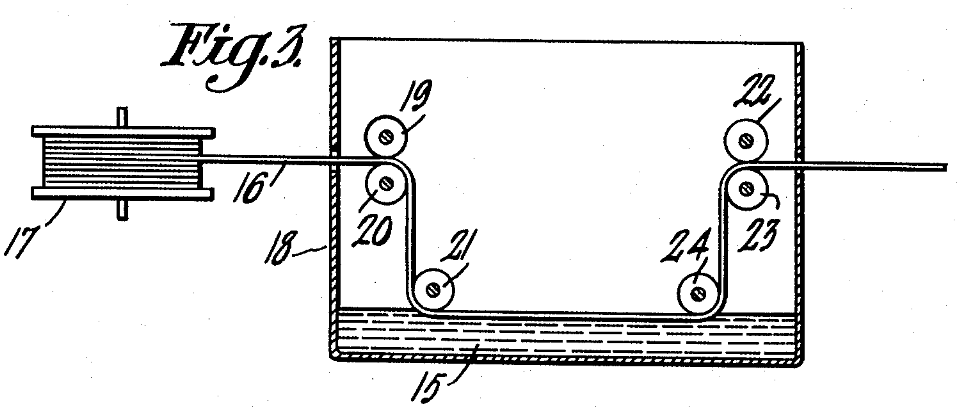
Fig. 3 illustrates a process of coating a wire by moving it in contact with the surface of a body of fluorescent material.

Fig. 3 shows a transfer element in the form of a wire or filament 16 adapted to be moved from a feed-reel 17 through a container 18 in contact with the surface of a fluorescent coating material 15. A plurality of guide rollers 19 to 24 are arranged to restrain the movement of the wire to the desired course of travel. From the container 18, the wire 16 may pass to a screen assembly device such as that illustrated by Fig. 7. Alternatively, it may pass to a printing or transfer device such as that illustrated by Figs. 4 and 5.

Fig. 4 illustrates a transfer or printing device which includes a trough 25 wherein the transfer elements, such as the strip 11 of Figs. 1 and 2, are assembled with their coated edges uppermost and with the different transfer elements so interleaved that each edge-coating which fluoresces in a given color is adjacent to an edge-coating which fluoresces in a different color. Above the trough 25 is a support 26 to which a screen base 27 is attached by any suitable means, such as spring clips 28 and 29. The screen base 27 may be pre-coated with an adhesive material suitable for holding the lines of fluorescent coating transferred to it from the edges of the transfer elements. In making the transfer, the screen base support 26 is moved in the direction indicated by the arrows in Fig. 4 to bring the screen base 27 into contact with the coating on the edges of the transfer elements while the latter are moving, preferably in the direction of the observer, to a take-up reel (not shown). This method of making the target screen has the important advantage that it can be repeated to produce a plurality of target screens with or without recoating the edges of the strips.

Figure 5:
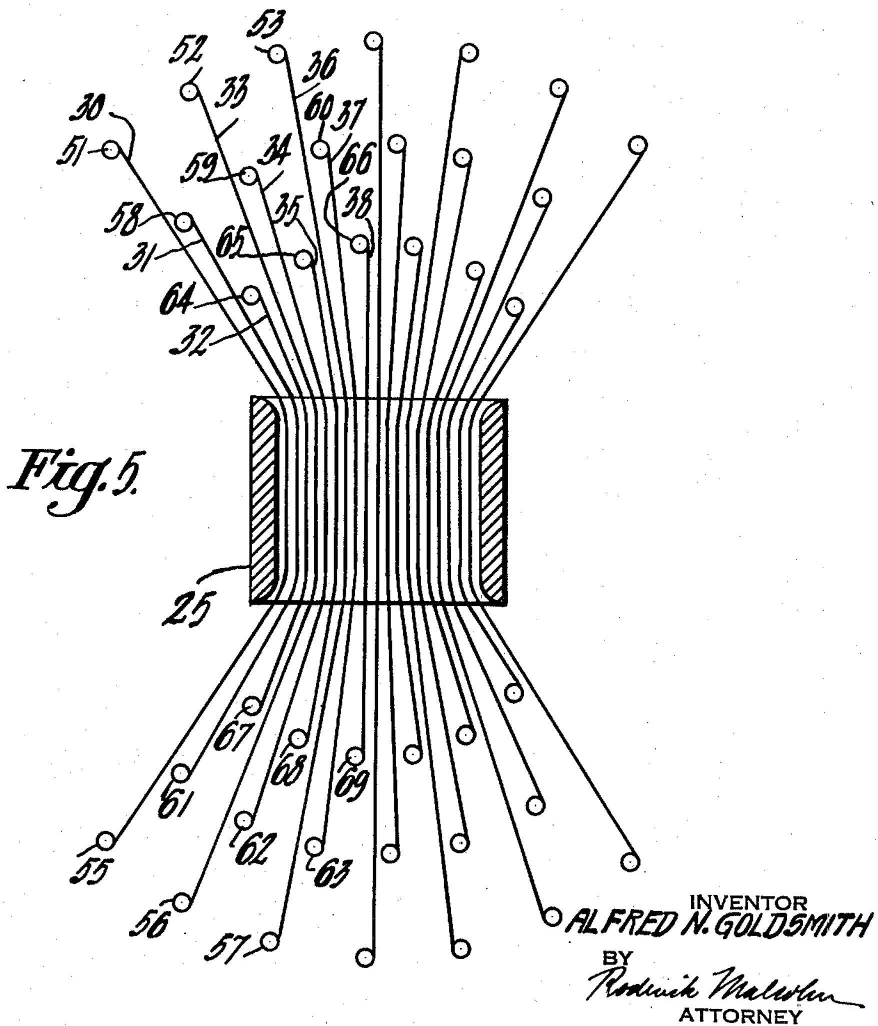
Fig. 5 shows one form of apparatus for passing the edge-coated strips or filaments through the retaining trough or guide of Fig. 4.

Fig. 5 shows an apparatus for feeding the coated transfer elements through the trough 25 of Fig. 4. After being coated in suitably located containers, the transfer elements pass to the assembly trough 25 and thence to take-up reels. For example, the transfer elements of similar coatings indicated by the numerals 30, 33 and 36 pass from coating devices schematically shown by reels 51, 52 and 53, through the trough 25 to take-up reels 55, 56 and 57. Similarly, transfer elements 31, 34 and 37 pass from reels 58, 59 and 60 to reels 61, 62 and 63; and transfer elements 32, 35 and 38 pass from reels 64, 65 and 66 to reels 67, 68 and 69. The trough 25 may be provided with shallow guide grooves, particularly when wires are used as transfer elements.

Figure 6:
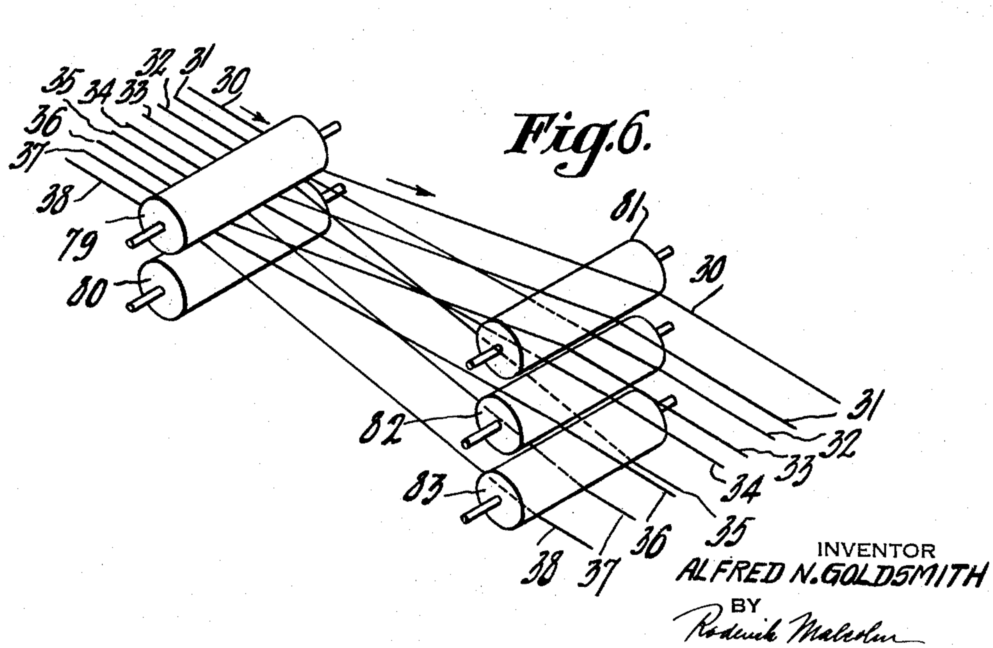
Fig. 6 shows an apparatus whereby coated wires are separated into similarly coated groups.

Difficulty may be encountered in handling the extremely large number of transfer elements necessary to print the desired multilinear screen. When coated wires are used as transfer elements, the apparatus shown in Fig. 6 may be used to separate the coated wires emerging from the trough 25 into groups each having the same kind of coating. It will be noted that all the wires pass between a pair of rollers 79 and 80 in the direction of the arrows. From these rollers, (1) the wires 30, 33 and 36 having like coatings pass over a roller 81, (2) the wires 31, 34 and 37 having like coatings pass over a roller 82, and (3) the wires 32, 35 and 38 having like coatings pass under a roller 83. Thus, the wires are separated into groups according to the color of the fluorescent material with which they are coated. For example, the wires 30, 33 and 36 may be coated with red fluorescent material, the wires 31, 34 and 37 with green fluorescent material, and the wires 32, 35 and 38 with blue fluorescent material. In actual practice of the invention, it is apparent that each group will include a much larger number of wires than is shown in Fig. 6.

Figure 7:
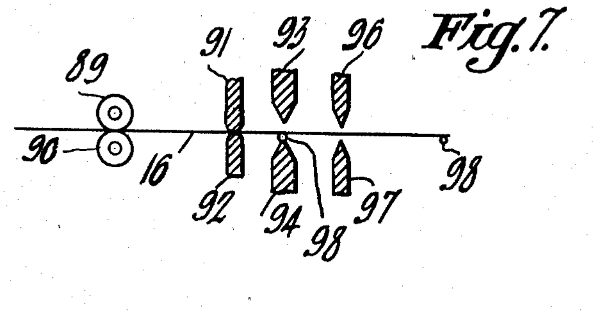
Fig. 7 illustrates a process of making a fluorescent screen of grid form.

In accordance with another feature of the invention, a multilinear fluorescent screen is made of coated wires 16, similar to the wires 30 to 38 described above, assembled with suitable supports to form fluorescent grids. The wires are first coated with fluorescent material in tanks, such as tank 18 of Fig. 3. Each group of wires having a particular coating is then cleaned at points to be spot-welded, then spot-welded to cross-wise supports and cut into segments of proper length to form the grids. An example of an apparatus for performing these operations is schematically shown in Fig. 7. The wires 16 of one group, say 30—33—36, etc., coated with red fluorescent material, for example, are fed, in the direction of the arrow, between two rollers 89 and 90, to cleaners 91 and 92. The group then passes between welding electrodes 93 and 94, where terminals or cross-wise supports 98 are welded to the wires at predetermined positions therealong. The group of wires is then cut by cutters 96 and 97 into segments to form grids G each having a pair of cross-wise supports 98 adjacent the ends thereof, also shown in Figs. 8 to 13. It will be understood that separate apparatus, similar to that shown in Fig. 6, will be provided for forming each group of similarly-coated wires into grids, G', G'' and G''', for example, as shown in Figs. 9, 10 and 11 respectively.

After leaving the cutters 96 and 97, each grid G has the form shown in Figs. 8 and 9, and consists of a multiplicity of parallel similarly-coated wire segments 16' of equal length connected at their ends by cross supports 98. For example, grid G' may be made up of wires 30—33—36 etc. of one color, connected by supports 98', as indicated in side elevation in Fig. 9.

In order to permit interspersing the three grids G', G'' and G''' to produce the desired screen, the ends of the wires 31—34—37 of the grid G'' are bent upwardly so that the cross supports 98'' lie above the plane of the wires, as shown in Fig. 10, and the ends of the wires 32—35—38 of grid G''' are bent downwardly, so that the supports 98''' lie below the plane of the wires, as shown in Fig. 11. The three grids are then assembled as shown in Figs. 12 and 13 to form a three-color screen assembly. Each of the three grids carries one of the three phosphor materials, such as red, blue or green.

The individual wires of each grid are preferably separated by a distance greater than twice their diameters, sufficient clearance being provided so that when three such grids are interlaced, they will not contact at any point along their length. The clearances should be as small as is consistent with practicable manufacture.

The invention provides improved apparatus and methods for manufacturing target screens having extremely narrow and closely adjacent lines of materials which fluoresce in different colors, such lines of materials being either (1) transferred to a screen base from edgewise-coated strips or coated wires, or (2) constituted by grids comprising coated wires and connecting cross supports.

What is claimed is:

1. In a method of manufacturing a target screen having adjacent lines of materials which fluoresce in different colors, the steps which include coating different groups of thin elements with different materials each of which fluoresces in a different color, assembling the elements in each group in spaced parallel relationship with adjacent elements separated by a distance greater than twice the thickness of each element, fixing cross-wise supports to the elements of each group, cutting said elements adjacent to said supports to form portions of said screen, and then positioning all of said portions in the same plane, with the elements of said different groups interspersed so that each element of each group is adjacent to an element of a different one of said groups.

2. In a method of manufacturing a target screen having adjacent lines of materials which fluoresce in different colors, the steps which include coating at least two different groups of thin linear elements with different materials each of which fluoresces in a different color, assembling the elements of each group in spaced parallel relationship with adjacent elements separated by a distance greater than twice the thickness of each element, fixing a pair of cross-wise supports to the elements of each group, cutting said elements adjacent to said supports to form portions of said screen, bending the ends of the elements of at least one of said portions to displace the cross-wise supports thereof out of the plane of said elements, and then positioning all of said portions in the same plane with the elements of said different groups interspersed so that each element of each group is adjacent to an element of a different one of said groups.

ALFRED N. GOLDSMITH.

References Cited in the file of this patent

UNITED STATES PATENTS

| Number | Name | Date |
|---|---|---|
| 1,876,953 | Johnson | Sept. 13, 1932 |
| 1,957,554 | Rector | May 8, 1934 |
| 2,280,946 | Goldsmith | Apr. 28, 1942 |
| 2,310,863 | Leverenz | Feb. 9, 1943 |
| 2,333,641 | Corwin | Nov. 9, 1943 |
| 2,359,514 | Eitel et al. | Oct. 3, 1944 |
| 2,416,056 | Kallman | Feb. 18, 1947 |
| 2,566,074 | Suchy | Aug. 28, 1951 |